United States Patent Office 2,809,194
Patented Oct. 8, 1957

2,809,194

THIADIAZINE TYPE NATRIURETIC AGENTS

Frederick C. Novello, Lansdale, Pa., assignor to Merck & Co., Inc., Rahway, N. J., a corporation of New Jersey No Drawing. Application May 2, 1956,
Serial No. 582,082

11 Claims. (Cl. 260—243)

This invention comprises novel benzothiadiazine-1,1-dioxide compounds containing a sulfamyl substituent in the benzenoid portion of the nucleus. The structural formula of the new compounds of this invention is illustrated below. In those compounds having no substitution other than hydrogen on either nitrogen in the benzothiadiazine-1,1-dioxide nucleus, the double bond is tautomeric, i. e. it exists either between the 2- and 3-position atoms or between the atoms in the 3- and 4-positions. In those compounds having a substituent on the nitrogen atom in the 2-position, the double bond exists between positions 3 and 4, and when substitution occurs on the $N^4$ atom, the double bond exists between positions 2 and 3. Thus, in general, the compounds can be considered having one of the general structures

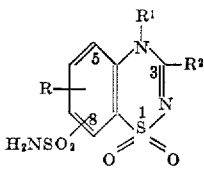

and

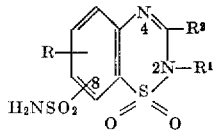

and their non-toxic alkali metal salts, wherein R is hydrogen, halogen such as chlorine, bromine or fluorine, lower alkyl advantageously having from 1 to 5 carbon atoms, and lower-alkoxy also advantageously containing from 1 to 5 carbon atoms in the alkyl portion of the radical; $R^1$ is hydrogen or a lower alkyl radical advantageously containing from 1 to 5 carbon atoms; and $R^2$ is hydrogen, a lower alkyl preferably having from 1 to 5 carbon atoms, or a mononuclear aryl such as a phenyl, benzyl, styryl and the like or similar radicals substituted in the phenyl moiety by halogen, lower alkyl, or lower alkoxy and the like radicals.

The new compounds of this invention are useful chemotherapeutic agents particularly because of their diuretic and/or natriuretic properties. The compounds can be administered in therapeutic dosages in conventional vehicles as in the form of a tablet as these compounds are effective upon oral administration as well as upon injection. As the compounds of this invention also are readily soluble in a dilute alkaline medium and in polyethylene glycol solutions, injectable solutions can be prepared by dissolving the compound in the selected medium to which preservatives can be added if desired.

The benzothiadiazine-1,1-dioxides of this invention can be prepared by a variety of methods. Two processes which have been found to be particularly well adapted to the preparation of these compounds can be illustrated as follows:

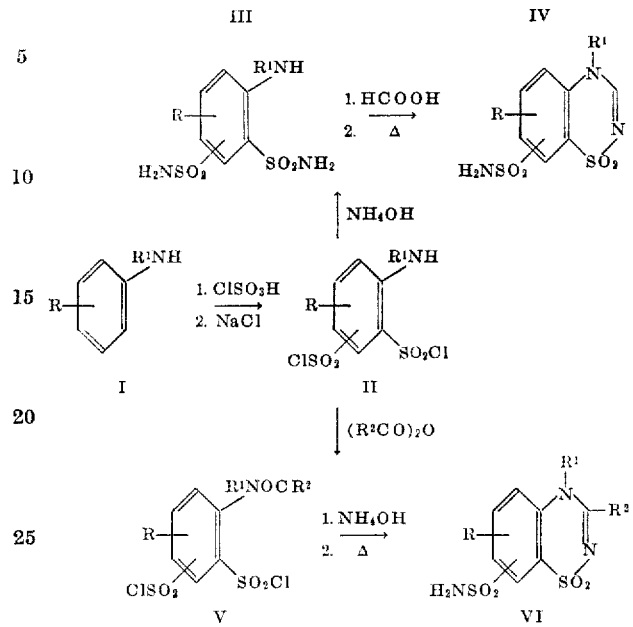

The process wherein the amino disulfonyl chloride is first converted to the amide, the amide then formylated and the compound cyclized is preferred when it is desired to prepare a benzothiadiazine-1,1-dioxide having no substituent on the carbon atom in the 3-position. The second method wherein the amino disulfonyl chloride is first acylated, then converted to the amide and subsequently cyclized is preferred when a benzothiadiazine-1,1-dioxide compound containing a substituent in the 3-position is to be prepared.

The chlorosulfonation of compound I is carried out in the presence of an alkali metal halide for example sodium, potassium or lithium chloride. For all practical purposes sodium chloride can be used as it is readily available, cheap, and in its presence the reaction proceeds quite smoothly. As the reaction between these ingredients is quite vigorous, it is preferred to add the aniline derivative to the chlorosulfonic acid dropwise with stirring and cooling. After all of the aniline derivative has been added, the alkali metal chloride is added in small portions to allow for the evolution of hydrogen chloride at a moderate rate. Following this, the mixture is heated at between about 100° to 200° C. preferably in an oil bath.

The disulfonyl chloride, II, thus obtained then can be converted to the disulfamyl derivative, III, by treatment with ammonia which advantageously can be added in the form of aqueous or alcoholic ammonium hydroxide, liquid ammonia or by dissolving the disulfonyl chloride in an organic solvent and bubbling ammonia gas into the solution to form the diamide compound. The diamide compound then is heated with formic acid or ethyl orthoformate at between about 100° to 150° C. after which the solvent is removed preferably by distillation thus forming the benzothiadiazine-1,1-dioxide compound, IV.

Alternatively, the amino disulfonyl chloride compound, II, can be acylated with an organic acid chloride or anhydride, the acid advantageously being selected from a lower alkanoic acid such as acetic acid, propionic acid, caproic acid and the like, or a mononuclear arylmonocarboxylic acid such as benzoic acid, phenylacetic acid, cinnamic acid, and the like. This reaction proceeds quite smoothly at room temperature yielding the N-acyldisulfonyl chloride derivative, V.

The acylated compound, V, then can be converted to the corresponding amide by the method described above employing, advantageously, aqueous or alcoholic ammonium hydroxide, liquid ammonia, or ammonia gas and the N-acyl-disulfamyl compound thus obtained is heated at between about 150° to about 250° C. to form the cyclized product, VI.

The alkali metal salts of the benzothiadiazine-1,1-dioxide compounds of this invention can be prepared by dissolving the selected compound in an aqueous or alcoholic solution of the alkali metal hydroxide, and, if desired, isolating the salt by evaporating the solvent. Any of the conventional alkali metal salts, such as the sodium, potassium, lithium or the like salt, can be prepared by this method or by other methods known to organic chemists.

The benzothiadiazine-1,1-dioxide compounds of this invention, IV and VI, as well as the disulfamyl compounds represented by structure III above are new compounds and both of these series of compounds have a high order of diuretic and/or natriuretic activity.

The preparation of these compounds is more fully described in the following examples. It is to be understood, however, that the examples are illustrative of the compounds embraced by this invention and of the methods for their preparation and are not to be construed as limiting the invention to the particular compounds or methods specifically described.

*Example 1.—6-chloro-7-sulfamyl-1,2,4-benzothiadiazine-1,1-dioxide*

Step a.—m-Chloroaniline (64 g., 0.5 mole) was added dropwise with stirring to 375 ml. of chlorosulfonic acid in a 3 liter round bottom, 3-necked flask cooled in an ice bath. Sodium chloride (350 g.) was added portionwise over a period of 1–2 hours and the mixture then heated gradually in an oil bath to 150° C. After 3 hours at 150–160° C., the flask was cooled thoroughly in an ice bath and the contents treated with a liter of cold water. The product was extracted with ether and the extract washed with water and dried over sodium sulfate. After removal of ether on the steam bath, the residual 5-chloroaniline-2,4-disulfonyl chloride, which may be crystallized from benzene-hexane M. P. 130–132° C., was cooled in an ice bath and treated with 150 ml. of 28% ammonium hydroxide in a 2 liter Erlenmeyer flask. The mixture was heated on the steam bath for 1 hour, cooled and the product collected on the filter, washed with water and dried. Upon crystallization from dilute alcohol 5-chloro-2,4-disulfamylaniline was obtained as colorless needles, M. P. 251–252° C.

Step b.—A solution of 88 g. of 5-chloro-2,4-disulfamylaniline in 1.1 liter of 88% formic acid was heated under reflux for 2 hours. After removal of 200 ml. of solvent by distillation, 1 liter of water was added and the product collected, washed with water and dried. Crystallization from dilute alcohol afforded 6-chloro-7-sulfamyl-1,2,4-benzothiadiazine-1,1-dioxide as colorless needles, M. P. 342.5–343° C.

*Example 2.—7-sulfamyl-1,2,4-benzothiadiazine-1,1-dioxide*

Step a.—o-Chloroacetanilide (15.2 g.) was added portionwise to 120 ml. chlorosulfonic acid at room temperature followed by portionwise addition of 100 g. of sodium chloride over 1 hour. The mixture was then heated gradually to 150° C. in an oil bath over a ½ hour period and then maintained at 150° C. for 2 hours. After cooling thoroughly in an ice bath, the reaction mixture was treated with 500 ml. of ice water and the product taken up in ether and washed with water and dried over sodium sulfate. After removal of ether by evaporation on the steam bath, the residual disulfonyl chloride was cooled in an ice bath and treated with 50 ml. of 28% ammonium hydroxide. The ammoniacal solution was heated on the steam bath for 1 hour, cooled and the product collected on the filter. Crystallization from dilute alcohol gave 6-chloro-2,4-disulfamylaniline as colorless needles, M. P. 242–244° C.

Step b.—A solution of 5.72 g. (0.02 mole) of 6-chloro-2,4-disulfamylaniline in a mixture of 100 ml. of water and 35 ml. of 5% aqueous sodium hydroxide was hydrogenated in the presence of 2 g. of 5% palladium-on-charcoal until hydrogen absorption ceased (½ hour). The solution was freed from catalyst and acidified with 2 ml. of concentrated hydrochloric acid to give 2,4-disulfamylaniline as colorless needles, M. P. 230–231.5° C.

Step c.—A solution of 3.3 g. of 2,4-disulfamylaniline in 10 ml. of 98–100% formic acid was heated on the steam bath for 1½ hours. Upon cooling, the precipitate was collected, washed with water and crystallized from dilute alcohol to give 7-sulfamyl-1,2,4-benzothiadiazine-1,1-dioxide as colorless needles, M. P. 319–320° C.

*Example 3.—6-bromo-7-sulfamyl-1,2,4-benzothiadiazine-1,1-dioxide*

Step a.—m-Bromoaniline (86 g., 0.5 mole) was added dropwise over a period of 1 hour to 375 ml. of chlorosulfonic acid cooled in an ice bath. Sodium chloride (350 g.) was added portionwise over 2 hours and the mixture then heated in an oil bath at 150° C. for 3 hours. After thorough cooling in an ice bath, the reaction mixture was treated with 1 liter of ice water. The product was taken up in ether, washed with water and dried. After removal of solvent on the steam bath, the residue was cooled in an ice bath and treated with 150 ml. 28% ammonium hydroxide. After the initial vigorous reaction had subsided, the mixture was warmed on the steam bath for 1 hour, cooled and the precipitate collected on the filter. Crystallization from dilute alcohol gave 5-bromo-2,4-disulfamylaniline as colorless needles. M. P. 265–267° C.

Step b.—Five grams of 5-bromo-2,4-disulfamylaniline was dissolved in 100 ml. of 98–100% formic acid by heating and the solution heated on the steam bath for 2 hours. After dilution with water, the precipitate was collected on the filter and reprecipitated from 5% aqueous sodium hydroxide with acetic acid to give 6-bromo-7-sulfamyl-1,2,4-benzothiadiazine-1,1-dioxide as colorless needles, M. P. 347–349° C. with decomposition (sample inserted at 250° C.).

*Example 4.—6-methyl-7-sulfamyl-1,2,4-benzothiadiazine-1,1-dioxide*

Step a.—By replacing the m-bromoaniline employed in Example 3, step a, by an equimolecular quantity of m-toluidine (53.5 gms.) and following substantially the same procedure described in step a of Example 3, 2,4-disulfamyl-5-methylaniline was obtained as colorless needles, melting point 246–247° C.

Step b.—By substituting 5 gms. of 2,4-disulfamyl-5-methylaniline for the 5-bromo-2,4-disulfamylaniline employed in step b of Example 3 and following substantially the same procedure described in step b of Example 3, 6 - methyl - 7 - sulfamyl - 1,2,4 - benzothiadiazine - 1,1-dioxide was obtained as colorless needles, M. P. 344–345° C. (dec.)

*Example 5.—7-chloro-6-sulfamyl-1,2,4-benzothiadiazine-1,1-dioxide*

Step a.—By replacing the m-bromoaniline employed in Example 3, step a, by an equimolecular quantity of 5-amino-2-chlorobenzenesulfonic acid, and following substantially the same procedure described in Example 3, step a, 4-chloro-2,5-disulfamylaniline was obtained as colorless needles, M. P. 289–290° C.

Step b.—Two grams of 4-chloro-2,5-disulfamylaniline was dissolved in 50 ml. of 98–100% formic acid and treated in the manner described in Example 3, step b, to give 7 - chloro - 6 - sulfamyl - 1,2,4 - benzothiadiazine- 1,1 - dioxide as colorless plates from acetone-petroleum ether, M. P. 327–330° C. (dec.).

*Example 6.—6 - sulfamyl - 1,2,4 - benzothiadiazine - 1,1-dioxide*

Step a.—4-chloro-2,5-disulfamylaniline (described in Example 5, step a) (5.72 g., 0.02 mole) was hydrogenated in the presence of 5% palladium-on-charcoal catalyst by substantially the same procedure described in Example 2, step b, to give 2,5-disulfamylaniline as colorless needles, M. P. 216–217° C.

Step b.—By replacing the 2,4-disulfamylaniline employed in Example 2, step c, by 2,5-disulfamylaniline prepared as described above and following substantially the same procedure as described in Example 2, step c, 6-sulfamyl - 1,2,4 - benzothiadiazine - 1,1 - dioxide was obtained as colorless needles, M. P. 311–314° C. (dec.).

*Example 7.—6 - methoxy - 7 - sulfamyl - 1,2,4 - benzothiadiazine-1,1-dioxide*

Step a.—Chlorosulfonic acid (150 ml.) was added dropwise over 30 minutes with stirring to 24.6 g. (0.2 mole) of m-anisidine cooled in an ice bath. After addition of chlorosulfonic acid was complete, 140 g. of sodium chloride was added portionwise over 1 hour. The mixture was heated for two hours on the steam bath and then for three hours in an oil bath, 150–160° C., cooled thoroughly in an ice bath and treated with 500 ml. of ice water. The product was taken up in ether, washed with water, dried and solvent evaporated on steam bath. The residue was cooled in an ice bath and treated with 100 ml. 28% ammonium hydroxide. The precipitate was collected on the filter, washed with water and recrystallized from water to give 2,4-disulfamyl-5-methoxyaniline as colorless needles, M. P. 252–253° C.

Step b.—2,4-disulfamyl-5-methoxyaniline (4 g.) was dissolved in 100 ml. of hot 98–100% formic acid and heated on the steam bath for 1½ hours. After removal of 50 ml. of solvent by distillation, the reaction mixture was cooled, diluted with water and the product collected on the filter and washed with water. Crystallization from dilute alcohol afforded 6 - methoxy - 7 - sulfamyl - 1,2,4-benzothiadiazine - 1,1 - dioxide as colorless needles, M. P. 309–310° C. (dec.).

*Example 8.—6 - chloro - 3 - methyl - 7 - sulfamyl - 1,2,4-benzothiadiazine-1,1-dioxide*

A solution of 5 g. of 5-chloroaniline-2,4-disulfonyl chloride in 15 ml. of acetic anhydride was allowed to stand at room temperature for 45 minutes. After cooling, the crystalline product was collected, treated with 50 ml. of 10% alcoholic ammonia and evaporated to dryness on the steam bath. The residue then was heated at 200° C. for 2 hours, cooled and recrystallized from dilute alcohol to give 6-chloro-3-methyl-7-sulfamyl-1,2,4-benzothiadiazine-1,1-dioxide as colorless needles, M. P. 332–333° C. (dec.).

*Example 9.—6 - chloro - 3 - phenyl - 7 - sulfamyl - 1,2,4-benzothiadiazine - 1,1 - dioxide*

Step a.—A solution of 6.6 g. of 5-chloroaniline-2,4-disulfonyl chloride, prepared as described in Example 1, step a, in 10 ml. of benzoyl chloride was allowed to stand at room temperature for 17 hours. The crystalline product was collected, washed with a small amount of benzene and crystallized from benzene-hexane to give N-benzoyl-5-chloroaniline-2,4-disulfonyl chloride as colorless needles, M. P. 171–173° C. (dec.).

Step b.—N-benzoyl-5-chloroaniline-2,4-disulfonyl chloride (7.4 g.) was added to excess liquid ammonia (50–75 ml.) and allowed to evaporate to dryness at room temperature. The residue, which can be crystallized from dilute alcohol to afford N-benzoyl-5-chloro-2,4-disulfamylaniline, M. P. 266° C. (dec.), was heated at 200° C. for 2 hours, cooled and dissolved in 50 ml. of 5% aqueous sodium hydroxide and filtered. After acidification of the filtrate with dilute hydrochloric acid, the product was collected, washed with water and recrystallized from dimethylformamide-water mixture. 6 - chloro - 3 - phenyl-7 - sulfamyl - 1,2,4 - benzothiadiazine - 1,1 - dioxide was obtained as colorless flakes, M. P. greater than 350° C.

*Example 10.—6-chloro-3-propyl-7 - sulfamyl-1,2,4-benzothiadiazine-1,1-dioxide*

Step a.—A solution of 5.4 g. of 5-chloroaniline-2,4-disulfonyl chloride, prepared as described in Example 1, step a, in a mixture of 10 ml. of butyric anhydride and 10 ml. of benzene was allowed to stand at room temperature for 1 hour. After cooling in an ice bath, the crystalline product was collected and crystallized from benzene-hexane to give N-butyryl-5-chloroaniline-2,4-disulfonyl chloride as colorless needles, M. P. 121–122° C.

Step b.—N-butyryl-5-chloroaniline-2,4-disulfonyl chloride (9.9 g.) was added portionwise to excess liquid ammonia (100 ml.) and allowed to evaporate to dryness at room temperature. The residue was dissolved in water and the solution acidified with dilute hydrochloric acid. The precipitate was collected and crystallized from dilute alcohol to give 6-chloro-3-propyl-7-sulfamyl-1,2,4-benzothiadiazine-1,1-dioxide as colorless needles, M. P. 302.5–303.5° C.

*Example 11.—3-amyl-6-chloro - 7 - sulfamyl-1,2,4-benzothiadiazine-1,1-dioxide*

Step a.—5-chloroaniline-2,4-disulfonyl chloride (5 g.), prepared as described in Example 1, step a, was dissolved in 10 ml. of n-caproic anhydride by warming gently on the steam bath and allowed to stand at room temperature for 2 hours. The crystalline product was collected and recrystallized from hexane to give N-caproyl-5-chloroaniline-2,4-disulfonyl chloride as colorless needles, M. P. 91–93° C.

Step b.—A solution of 5.2 g. of N-caproyl-5-chloroaniline-2,4-disulfonyl chloride in 25 ml. of concentrated ammonium hydroxide was heated on the steam bath for 1½ hours, cooled and acidified with dilute hydrochloric acid. The precipitate was collected and crystallized from dilute alcohol to give 3-amyl-6-chloro-7-sulfamyl-1,2-4-benzothiadiazine-1,1-dioxide as colorless plates, M. P. 269–270° C.

*Example 12.—6-chloro-4-methyl-7-sulfamyl-1,2,4-benzothiadiazine-1,1-dioxide*

Step a.—By replacing the m-chloroaniline employed in Example 1, step a, by an equimolecular quantity of N-methyl-m-chloroaniline and then following the same procedures described in steps a and b of Example 1, there was obtained 6-chloro-4-methyl-7-sulfamyl-1,2,4-benzothiadiazine-1,1-dioxide.

*Example 13.—3-benzyl-6-fluoro-7 - sulfamyl-1,2,4-benzothiadiazine-1,1-dioxide*

Step a.—By replacing the m-chloroaniline in Example 1, step a, by an equimolecular quantity of m-fluoroaniline and following substantially the same procedure described in step a of Example 1 for the preparation of 5-chloroaniline-2,4-disulfonyl chloride, 5-fluoroaniline-2,4-disulfonyl chloride was prepared.

Step b.—5-fluoroaniline-2,4-disulfonyl chloride was dissolved in phenylacetyl chloride and allowed to stand at room temperature for 17 hours. The product was collected and washed with benzene to give N-phenylacetyl-5-fluoroaniline-2,4-disulfonyl chloride.

Step c.—N-phenylacetyl-5-fluoroaniline-2,4-disulfonyl chloride was added to excess liquid ammonia and allowed to evaporate to dryness at room temperature. The residue was heated at 200° C. for 3 hours, cooled and the residue crystallized from dilute alcohol to give 3-benzyl-6-fluoro-7-sulfamyl-1,2,4-benzothiadiazine-1,1-dioxide.

*Example 14.—2-methyl - 7 - sulfamyl-1,2,4-benzothiadiazine-1,1-dioxide*

Step a.—A mixture of 10 g. of o-aminobenzenesulfonmethylamide and 25 ml. of ethyl orthoformate was heated at 125–135° C. for 30 minutes. Solvent was then removed by distillation in vacuo and the residue crystallized from alcohol to give 2-methyl-1,2,4-benzothiadiazine-1,1-dioxide.

Step b.—2 - methyl - 1,2,4-benzothiadiazine-1,1,-dioxide was treated with chlorosulfonic acid and heated on the steam bath for 2 hours, cooled and poured onto ice. Treatment of the product with 28% ammonium hydroxide gave 2-methyl - 7 - sulfamyl-1,2,4-benzothiadiazine-1,1-dioxide.

*Example 15.—Sodium salt of 6-chloro-7-sulfamyl-1,2,4-benzothiadiazine-1,1-dioxide*

6-chloro - 7-sulfamyl-1,2,4-benzothiadiazine-1,1-dioxide, obtained as described in Example 1, was dissolved in alcoholic sodium hydroxide and the solvent then evaporated in vacuo yielding the sodium salt of 6-chloro-7-sulfamyl-1,2,4-benzothiadiazine-1,1-dioxide.

*Example 16.—Compressed tablet comprising 0.5 g. active ingredient*

|  | G. |
|---|---|
| 6-chloro - 7 - sulfamyl - 1,2,4-benzothiadiazine-1,1-dioxide | 500.0 |
| Starch paste 12½%, 100 cc., allow | 12.5 |
|  | 512.5 |
| Starch, U. S. P. Corn | 25.0 |
| Magnesium stearate | 5.5 |
|  | 543.0 |

The 6-chloro-7-sulfamyl-1,2,4-benzothiadiazine-1,1-dioxide is granulated with the starch paste and while moist passed through a No. 14 screen, dried at 45° C. for 20 hours and then passed 3 times through a No. 14 screen. The starch then is passed through a No. 90 bolting cloth onto the granulation and all ingredients are blended thoroughly. Then the magnesium stearate is passed through a No. 90 bolting cloth onto the granulation and these ingredients are blended after which the granulation is compressed into tablets using a 14/32" flat, bevelled, scored punch having a thickness of 0.205±0.005" yielding 1,000 tablets, each weighing 0.543 gram and having a hardness of 6 kgms. measured by the Monsanto Chemical Company tablet hardness tester apparatus, and a disintegration time of 5 minutes when tested on the U. S. P. tablet disintegrating apparatus (U. S. Pharmacopoeia, 15th edition, page 937).

While the above examples describe the preparation of certain illustrative compounds illustrated by the structure in column 1, lines 30 to 45, and a certain specific dosage form suitable for administering the novel compounds of this invention in human therapy, it is to be understood that the invention is not to be limited by these examples or by the specific reaction conditions described for the preparation of the compounds or by the specific ingredients included in the pharmaceutical preparation but is understood to embrace variations and modifications falling within the scope of the appended claims.

What is claimed is:

1. Thiadiazine compounds selected from the class consisting of compounds having one of the general structural formulae

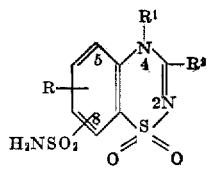

and

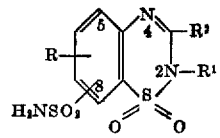

and their non-toxic alkali metal salts, wherein R is selected from the group consisting of hydrogen, halogen, lower alkyl, and lower alkoxy radicals; $R^1$ is selected from the group consisting of hydrogen and lower alkyl radicals; and $R^2$ is selected from the group consisting of hydrogen, lower alkyl, phenyl, and benzyl radicals.

2. Thiadiazine compounds having one of the general structural formulae

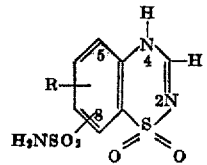

and

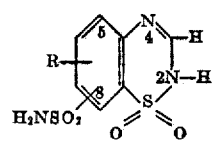

wherein R is halogen.

3. 6 - chloro - 7 - sulfamyl - 1,2,4 - benzothiadiazine-1,1-dioxide.

4. Thiadiazine compounds having one of the general structural formulae

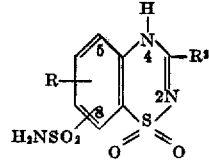

and

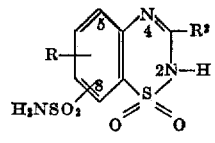

wherein R is halogen and $R^2$ is a lower alkyl radical.

5. Thiadiazine compounds having one of the general structural formulae

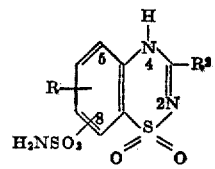

and

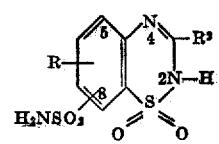

wherein R is chlorine; and $R^2$ is a lower alkyl radical.

6. 3 - amyl - 6 - chloro - 7 - sulfamyl - 1,2,4 - benzothiadiazine-1,1-dioxide.

7. 6 - chloro - 3 - methyl - 7 - sulfamyl - 1,2,4 - benzothiadiazine-1,1-dioxide.

8. 6 - chloro - 3 - propyl - 7 - sulfamyl - 1,2,4 - benzothiadiazine-1,1-dioxide.

9. Thiadiazine compounds having one of the general structural formulae

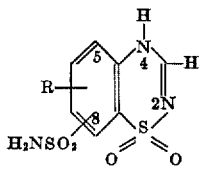

and

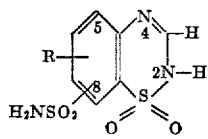

wherein R is a lower alkoxy radical.

10. 6 - methoxy - 7 - sulfamyl - 1,2,4 - benzothiadiazine-1,1-dioxide.

11. A process for preparing a benzothiadiazine-1,1-dioxide compound comprising an aminobenzene disulfonyl chloride having the general structural formula

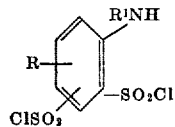

wherein R is selected from the group consisting of hydrogen, halogen, lower alkyl, and lower alkoxy radicals; and $R^1$ is selected from the group consisting of hydrogen, and a lower alkyl radical; to react with ammonia in quantity in excess of that required to form the corresponding aminobenzene disulfonamide which then is heated at between about 100–150° C. with a compound selected from the class consisting of formic acid and ethyl orthoformate in quantity in excess of a molar equivalent yielding a benzothiadiazine-1,1-dioxide of the general structural formula

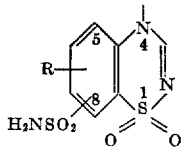

No references cited.

UNITED STATES PATENT OFFICE
Certificate of Correction

Patent No. 2,809,194

Frederick C. Novello

October 8, 1957

It is hereby certified that error appears in the printed specification of the above numbered patent requiring correction and that the said Letters Patent should read as corrected below.

Column 9, line 26, after "comprising" insert —causing—; column 10, lines 20 to 25, the formula should appear as shown below instead of as in the patent:

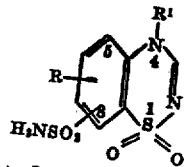

Signed and sealed this 31st day of December 1957.

[SEAL]

Attest:
KARL H. AXLINE,
*Attesting Officer.*

ROBERT C. WATSON,
*Commissioner of Patents.*